United States Patent
Zhang

(10) Patent No.: US 6,652,977 B2
(45) Date of Patent: Nov. 25, 2003

(54) PRIMER COMPOSITION

(75) Inventor: Jun Qing Zhang, Mason, OH (US)

(73) Assignee: Johnson Diversey, Inc., Sturtevant, WI (US)

( * ) Notice: Subject to any disclaimer, the term of this patent is extended or adjusted under 35 U.S.C. 154(b) by 0 days.

(21) Appl. No.: 09/950,358

(22) Filed: Sep. 10, 2001

(65) Prior Publication Data

US 2003/0082389 A1 May 1, 2003

(51) Int. Cl.[7] .................................................. B32B 9/04
(52) U.S. Cl. ............. 428/450; 106/287.16; 106/287.11; 428/447; 524/838; 528/23; 528/34; 528/38
(58) Field of Search .......................... 427/387; 428/447, 428/450; 528/23, 34, 38; 106/287.11, 287.16; 524/838

(56) References Cited

U.S. PATENT DOCUMENTS

| | | | | |
|---|---|---|---|---|
| 4,689,085 A | * | 8/1987 | Plueddemann | 106/287.14 |
| 4,980,396 A | * | 12/1990 | Yoshida | 523/212 |
| 5,093,454 A | * | 3/1992 | Fujimoto et al. | 528/34 |
| 5,639,555 A | * | 6/1997 | Bishop | 428/447 |
| 5,674,936 A | * | 10/1997 | Lucas | 524/731 |
| 5,717,009 A | * | 2/1998 | Matsushita et al. | 523/212 |
| 6,020,408 A | * | 2/2000 | Suzuki et al. | 524/265 |
| 6,171,409 B1 | | 1/2001 | Hamacker et al. | |
| 6,179,934 B1 | | 1/2001 | Kawakami et al. | |
| 6,197,126 B1 | | 3/2001 | Roland et al. | |
| 6,215,011 B1 | * | 4/2001 | Bishop | 556/413 |
| 6,284,309 B1 | * | 9/2001 | Bishop et al. | 216/105 |
| 6,294,620 B1 | * | 9/2001 | Huang et al. | 525/452 |

FOREIGN PATENT DOCUMENTS

| | | | | |
|---|---|---|---|---|
| JP | 2001098073 A | * | 4/2001 | C08G/77/26 |

* cited by examiner

Primary Examiner—Robert Dawson
Assistant Examiner—Marc S Zimmer
(74) Attorney, Agent, or Firm—Wood, Herron & Evans, L.L.P.

(57) ABSTRACT

A primer composition for metal surfaces is described. The primer composition has a coupling-agent and a cross-linking agent and may be used for epoxy-based paints in the absence of a phosphate coating and a chromic acid rinse.

14 Claims, No Drawings

PRIMER COMPOSITION

FIELD OF THE INVENTION

The present invention is directed to a primer composition. More particularly, the invention is directed to a primer composition comprising a coupling-agent and a cross-linking agent. The primer composition adheres well to metal surfaces and may be used to treat metal surfaces in order to enhance paint adhesion and corrosion resistance properties of the surfaces. Such enhancement of properties unexpectedly results without employing, among other things, environmentally unfriendly agents in the primer composition.

BACKGROUND OF THE INVENTION

It is well known that metal parts typically require cleaning before they are subjected to a final coating stage, such as a painting stage. This is true because many metal parts (e.g., auto parts, appliance parts, furniture parts) are typically made and/or molded in environments that generate metal shavings and/or sludge. Moreover, such metal parts have surfaces that are often contaminated with grease (or other lubricants) as a result of manufacturing processes.

Present methods for cleaning soiled metal parts typically use an alkaline detergent composition to initially wash the soiled metal part. Subsequent to the initial wash, the metal part is rinsed with water and then subjected to a phosphate coating process. Conventional phosphate coating processes generally employ a phosphate coating technique that utilizes zinc, iron or manganese phosphate in an acidic bath or spray. After coating the metal part with phosphate, a rinse occurs to remove any active chemicals that remain on the surface of the metal. The resulting treated metal part is then given a final chemical treatment, like a chromic acid rinse. The chemical treatment is generally desired to ensure that the metal part is made corrosion resistant and that no phosphating acid and hard water salts remain on the metal parts before the required drying, and painting steps.

The conventional method outlined above (and generally accepted by the ASM Committee on Phosphate Coating) uses primer compositions that require the presence of environmentally unfriendly agents. The conventional method also requires many processing steps, including a drying step and a final rinse step after the primer composition is applied. It is of increasing interests to develop a primer composition that may be easily applied, does not employ environmentally unfriendly agents and does not require a rinsing step after application. This invention, therefore, is directed to an environmentally friendly primer composition that does not contain or require the use of metal phosphates and/or any transition metal acids, like chromic acid. Moreover, the environmentally friendly primer composition of the present invention is capable of being used where dry-in-place primer applications are desired.

Additional Information

Efforts have been disclosed for treating metal surfaces. In U.S. Pat. No. 6,179,934, an aqueous zinc phosphate conversion coating having a hydroxylamine source is described.

Still other efforts have been disclosed for treating metal surfaces. In U.S. Pat. No. 6,197,126, a nickel-free, copper-containing phosphate composition is disclosed wherein the composition may be used to treat metal surfaces to improve lacquer adhesion.

Even further in U.S. Pat. No. 6,171,409, a method for treating metal surfaces with a phosphating or pickling solution is described whereby the process includes at least one vigorous and thorough mixing step.

None of the references mentioned above describes a primer composition having a coupling-agent and a cross-linking agent as disclosed in the present invention. Additionally, metal, as used herein, is defined to mean a substance comprising a transition metal or aluminum, or a substance capable of being a conductor of electricity, or any combination thereof. Good adhesion properties, as used herein, are defined to mean having a creepage value of 2.75 millimeters or less after 508 hours and/or of 4.25 millimeters or less after 1008 hours. Dry-in-place, as used herein, is defined to mean ready to be painted without having to be rinsed.

SUMMARY OF THE INVENTION

In a first aspect, the present invention is directed to a primer composition comprising a cross-linking agent and a coupling-agent wherein the cross-linking agent comprises silicon and the coupling-agent comprises silicon.

In a second aspect, the present invention is directed to a method which uses the primer composition of the first aspect, including a method for reducing corrosion (e.g., rust) on metal surfaces.

In a third aspect, the present invention is directed to a substrate having been subjected to the primer composition described above.

DETAILED DESCRIPTION OF THE PREFERRED EMBODIMENTS

There is no limitation with respect to the cross-linking agent that may be used in this invention other than that the cross-linking agent is one which may be used in a primer composition. In a preferred embodiment, however, the cross-linking agent comprises at least three (3) sites of cross-linking reactivity, and has the general formula:

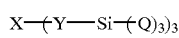

wherein X is a trivalent group, each Y is independently a divalent group (i.e., divalent bridging radical), each Q is independently or or a combinations of —R and —OR and each R is independently a $C_{1-10}$ alkyl group or an aryl group.

In a more preferred embodiment, X has the formula selected from:

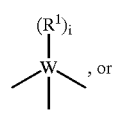

I

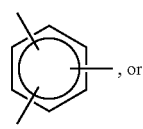

II

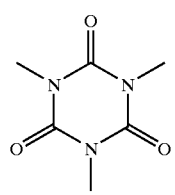

III wherein W is C, N or P, $R^1$ is a H, $C_{1-10}$ alkyl or aryl, with the proviso that i is 1 when W is C, and i is 0 when W is not C, and each Y is independently

or

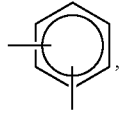

with n being an integer from about 1 to about 10.

In a most preferred embodiment, X is represented by Formula III, each Y is

and Q is OR and R is a methoxy group.

Such a most preferred cross-linking agent is made available by OSi Specialties and sold under the name Silquest® Y-11597. Regarding the coupling-agent which may be used in this invention, such a coupling-agent is limited only to the extent that it may be used in a primer composition. The coupling-agent may be selected from compounds like gamma-aminopropyltriethoxysilane (Silquest®A-1101 silane, and Silquest®A-I 102 silane), aminoalkyl silicone solution (Silquest®A-1106 silane), modified aminoorganosilane (Silquest®A-1108 silane and Silquest®A-1126 silane), gamma-aminopropyltrimethoxysilane (Silquest®A-1110 silane), N-beta (aminoethyl)-gamma-aminopropyltrimethoxysilane (Silquest®A-1120 and Dow Corning®Z-6020 silane), modified aminosilane (Sllquest®A-1128 silane), triaminofunction silane (Silquest®A-1130 silane) N-phenyl-gamma-aminopropyltrimethoxysilane (Silguest®Y-9669 silane), organomodified polydimethylsiloxane (Silquest®Y-11343 silane), polyazamide silane (Silquest®A-1187 silane), or N-beta-(aminoethyl)-gamma-aminopropylmethyldimethoxysilane (Silquest®a-2120 silane), whereby the compounds are made available by Osi Specialties. These are water soluble silanes.

In a preferred embodiment, however, the coupling-agent of this invention comprises at least one (1) site of coupling reactivity, and has the general formula:

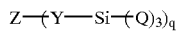

wherein Z is a monovalent or divalent portion of the coupling-agent, Y and Q are as previously defined and q is 1 when Z is monovalent and 2 when Z is divalent.

In a more preferred embodiment, Z, when monovalent, is

   or   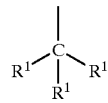

and, when divalent,

   or   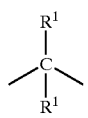

where $R^1$ is as previously defined and each Y is independently a

   or   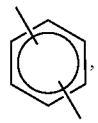, with n being as previously defined.

In a most preferred embodiment, Z, when monovalent, is —$NH_2$ and, when divalent

and Y is

and R is —$OCH_2CH_3$.

Such most preferred coupling-agents are made available by OSi Specialties. When q is 1, the coupling-agent is referred to as gamma-aminopropyltriethoxysilane, and when q is 2, the coupling-agent is referred to as bis-(gamma-triethoxysilylpropyl) amine, sold under the names Silquest A-1100 and Silquest A-1170, respectively.

When preparing the primer composition of the present invention, it is generally preferred to employ from about 0.0001 to about 30.0%, and preferably, from about 0.0005 to about 15%, and most preferably, from about 0.0008 to about 1.0% by weight cross-linking agent, based on total weight of the primer composition, including all ranges subsumed therein.

Regarding the amount of coupling-agent used, typically from about 0.0001 to about 30.0%, and preferably, from about 0.0005 to about 15%, and most preferably, from about 0.0008 to about 1.0% by weight coupling-agent is used, based on total weight of the primer composition, including all ranges subsumed therein.

As to the ratio of cross-linking agent to coupling-agent, the ratio of cross-linking agent to coupling-agent is from about 15:1 to about 1:15, and preferably, from about 10:1 to about 1:10, and most preferably, from about 5:1 to about 1:5.

In addition to cross-linking agent and coupling-agent, it is preferred to include in the primer composition of this invention a carrier liquid, and optional additives such as acids.

The carrier liquid used in the primer composition of the present invention is preferably water and/or organic solvents, and the carrier liquid (especially when water) typically makes up the balance of the primer composition.

The organic solvents that may be used in this invention include, for example, glycols like $C_2$ to $C_8$ alkylene glyols as well as ethers thereof. Other organic solvents that may be used include alkanols (including diols), xylene, toluene and pyrrolidone. The preferred organic solvent used in this invention is, however, methanol, hexylene glycol or mixtures thereof. Preferred organic solvents include 1,2-propanediol, 3-methoxy-3-methyl-1-butanol, Dipropylene glycol, ethylene glycol, glycerine, hexylene glycol, methanol, phenoxyethanol, polyethylene glycol and mixtures thereof. The most preferred organic solvents used in this invention are however, methanol, hexylene glycol and mixtures thereof.

The amount of organic solvent used in this invention is typically less than about 99.0% by weight, based on total weight of the primer composition, and preferably, from about 0.01 to about 95%, and most preferably, from about 0.01 to about 10.0% by weight, based on total weight of the primer composition.

The acids that may be used in this invention include inorganic acids, organic acids, and mixtures thereof. The inorganic acids that may be used include, for example, sulfuric acid, hydrochloric acid, phosphoric acid and mixtures thereof. The organic acids which may be used include carboxylic acids like propionic acid, butyric acid, citric acid, acetic acid, glyolic acid and mixtures thereof. Typically, the amount of acid used in the primer compositions of this invention is from about 0.0001 to about 15.0%, and preferably, from about 0.0005 to about 10.0%, and most preferably, from about 0.0008 to about 5.0% by weight acid, based on total weight of the primer composition, including all ranges subsumed therein. In an especially preferred embodiment, the pH of the primer composition is less than about 6.5, and preferably, from about 1.5 to about 6.0, and most preferably, from about 2.5 to about 5.5, including all ranges subsumed therein.

When making the primer composition of this invention, the ingredients (e.g., cross-linking agent, coupling-agent, and water) are added to a mixing vessel in no particular order. The ingredients are stirred at moderate sheer until the desired primer composition is obtained. The pressure and temperature at which the stirring occurs is limited only to the extent that a primer composition may be made.

It is also within the scope of this invention to mix the desired ingredients (e.g., cross-linking agent and coupling-agent), in the manner described above, without carrier liquid in order to prepare a concentrate that subsequently can be combined with other ingredients, like water.

The in use primer composition (i.e., primer composition as used by the end user) comprises the primer composition of this invention diluted with about 50.0 to 99.99%, and preferably, from about 60.0 to about 99.95%, and most preferably, from about 75.0 to about 99.90% by weight water, based on total weight of in use primer composition, including all ranges subsumed therein.

When applying the primer composition of this invention to a metal surface, it is generally preferred to first clean (followed by rinsing with water) the metal surface with, for example, any well known alkaline detergent, including those made available (e.g., under the names Liquid MC 726 and Liquid Ferro Terj) by suppliers like Diversey Lever. It is also within the scope of this invention to pickle the metal surface with mineral acid, like sulfuric acid, before the primer composition is applied. After cleaning and rinsing the metal surface, the metal surface may then be contacted with the primer composition of the present invention. There is no limitation with respect to how the metal surface is contacted with the primer composition as long as an even/homogeneous layer of primer is applied to the metal surface. Typically, the techniques used to apply the primer composition of the present invention to a metal surface include dipping, spraying (at about 2.0 to about 1000 psi) or brushing, preferably, spraying. Subsequent to contacting the metal surface with the primer composition, the primer composition may be dried by means which include air drying and oven drying. The metal surface, now having the primer composition applied thereon, does not have to be rinsed, can dry-in-place, and may be painted (coated) with any commercially available paint, and preferably, an epoxy resin paint. Unexpectedly, excellent painting results are observed when using the primer composition of the present invention in the absence of a phosphate coating technique, a final chemical treatment step (like a chromic acid rinse) and a final rinse and drying step. Moreover, the primer composition of the present invention yields metal surfaces that are resistant to corrosion (e.g., rusting).

The following examples are provided to illustrate an understanding of the present invention. The examples are not intended to limit the scope of the claims.

EXAMPLE 1

Primer composition was prepared by mixing the following ingredients:

|  | Wt. % |
| --- | --- |
| Cross-linking agent (Sliquest Y-11597) | 0.2% |
| Coupling-agent (Silquest A-1100) | 0.2% |
| Coupling-agent (Silquest A-1170) | 0.4% |
| Phosphoric acid | 1.5% |
| Methanol | 5.0% |
| Deionized water | Balance |

In use primer composition was made by adding 3.0% by weight of the above primer composition to 97.0% by weight water.

EXAMPLE 2

Metal panels, standard cold-rolled steel panels made available from Q-Panel Lab Products and product panels from John Deere, were obtained. The metal panels were cleaned with alkaline cleaner MC-726 as made available from Diversey Lever (about 2 ounces of cleaner per gallon of tap water at about 145° F.). The cleaning was achieved by immersing or spraying the metal parts, rinsing with water and pickling the metal parts with phosphoric acid in order to produce clean metal panels. The clean metal panels were sprayed (for about 20 to 70 seconds) or immersed in the in use primer composition of this invention (at ambient temperature for about 60 seconds) and then dried by forced air or with an oven. The resulting primed panels were subsequently painted (homogenously coated with an epoxy paint) and then scribed and salt sprayed per ASTM Standards B117.

The resulting test panels were subjected to a tape pull and knife scrape in a manner described by ASTM D1654 Procedure A, Method 2. Mean creepage (coating lift) along the scribe was recorded in terms of time (hours) and millimeters of creepage. The data has been recorded in the Table and shows that the primer composition of the present invention has good adhesion and corrosion resistant properties, even in the absence of environmentally unfriendly agents.

TABLE 1

| Coated Material | Creepage in Millimeters | |
|---|---|---|
| | 508 hours | 1008 hours |
| Bonderite ® 1000/P60[i] | 0 | 0.5 |
| Bonderite ® 1000/P95[i] | 0 | 0.5 |
| Q-Panel (iron-phosphated)[ii] | 0 | 2.0 |
| Q-Panel (zinc-phosphated)[iii] | 0 | 0.5 |
| Q-Panel (zinc-phosphated)[iv] | 0 | 0 |
| Steel-Panel (HCL Pickled)[v] | 0 | 0.5 |
| Steel-Panel (phosphoric acid)[vi] | 1.0 | 1.5 |
| Steel Panel (MC-726 cleaned) | 2.5 | 4.0 |

[i]purchased form ACT Laboratories, Inc. 1000/P60 being iron phosphatized in the presence of chrome and 1000/P95 being iron phosphatized in the absence of chrome.
[ii]iron phosphatized with Diversey Lever SECURE and subjected to the in use primer composition of Example I.
[iii]zinc phosphatized with Diversey Lever Perma-Guard 3048 and subjected to the in use primer composition of Example 1.
[iv]zinc phosphatized with Diversey Lever Perma-Guard 3096 and subjected to the in use primer composition of Example 1.
[v]cleaned with Diversey Lever MC-726 then pickled with HCL and subjected to the in use primer composition of Example 1
[vi]pickled with Diversey Lever ORBIT NF and subjected to the in use primer composition of Example 1
[vii]cleaned with Diversey Lever MC-726 and subjected to primer composition of Example 1

EXAMPLE 3

The metal panel primed in the manner described in case V (pickled with HCL) was successfully painted with the following eleven epoxy based paints
1. EFB-534-SO, flat black, DuPont
2. EFH-400-S9, gray, DuPont
3. EFR-600-S8, alert red, DuPont
4. SE-2004, white, Ferro
5. SE-3003, flat black, Ferro
6. 10-1172, corvel white, Morton
7. 10-10-7003, matte black, Morton
8. PCM 50105, blue, PPG
9. PCM 67101, dark red, PPG
10. EBS2-C000, iron gate, Sherwin-Williams
11. ELS8-C002, safety blue, Sherwin-Williams The painted panels were visually inspected and the results indicate that the primer composition of this invention may successfully be used with a variety of commercially available epoxy-based paints.

What is claimed is:

1. A primer composition comprising at least 50% by weight water and a cross-linking agent having the formula:

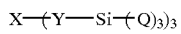

and X is selected from the group consisting of

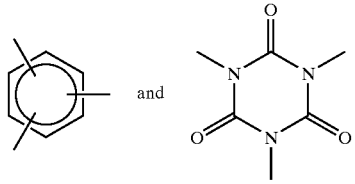

each Y is independently a divalent group, each Q is independently —OR or a combination of —R and —OR and each R is independently a $C_{1-10}$ alkyl group or aryl group, and a coupling agent comprising silicon a water soluble silane.

2. The primer composition according to claim 1 wherein the coupling-agent has the formula:

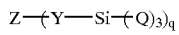

and Z is a monovalent or divalent amine group, each Y is independently a divalent group, each Q is independently —OR or a combination of —R and —OR and each R is independently a C110 alkyl group or aryl group, and q is 1 when Z is monovalent and 2 when Z is divalent.

3. The primer composition according to claim 1 wherein the primer composition further comprises an organic solvent.

4. The primer composition according to claim 1 wherein the composition further comprises an acid selected from the group consisting of sulfuric acid, hydrochloric acid, phosphoric acid, propionic acid, butyric acid, citric acid, acetic acid, glycolic acid and mixtures thereof.

5. The primer composition according to claim 1 wherein each Y is independently

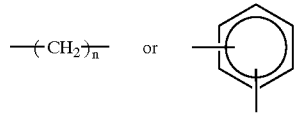

with n being an integer form about 1 to 10.

6. A primed metal surface, the primed metal surface having a primer composition comprising a cross-linking agent as defined in claim 1.

7. The primed metal surface according to claim 6 wherein the primer composition further comprises water, organic solvent, or both.

8. The primed metal surface according to claim 6 wherein the primed metal surface is an automobile part, appliance part or furniture part.

9. The primed metal surface according to claim 6 wherein the metal surface is corrosion resistant and paintable.

10. A method of treating a metal surface comprising the steps of:
(a) contacting a metal surface with a primer composition to produce a primed metal surface, the primer composition comprising at least 50% water and a cross-linking agent wherein the cross-linking agent has the formula:

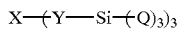

and X is selected from the group consisting of

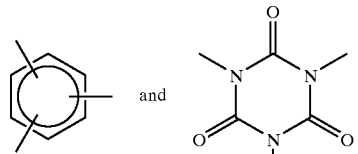

each Y is independently a divalent group, each Q is independently —OR or a combination of —R and —OR and each R is independently a $C_{1-10}$ alkyl group or aryl group and a coupling-agent wherein the coupling-agent comprises a water soluble silane; and
(b) allowing the primed metal surface to dry.

11. The method for treating a metal surface according to claim 10 wherein the coupling-agent has the formula:

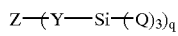

and Z is a monovalent or divalent amine, each Y is independently a divalent group, each Q is independently —OR or a combination of —R and —OR and each R is independently a $C_{1-10}$ alkyl group or aryl group and q is 1 when Z is monovalent and 2 when Z is divalent.

12. The method for treating a metal surface according to claim 10 wherein the primer composition further comprises an organic solvent.

13. The method for treating a metal surface according to claim 10 wherein the primed metal surface is corrosion resistant.

14. The method for treating a metal surface according to claim 10 wherein each Y is independently

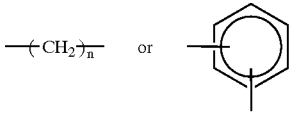

with n being an integer from about 1 to 10.

* * * * *

UNITED STATES PATENT AND TRADEMARK OFFICE
CERTIFICATE OF CORRECTION

PATENT NO. : 6,652,977 B2
DATED : November 25, 2003
INVENTOR(S) : Jun Qing Zhang It is certified that error appears in the above-identified patent and that said Letters Patent is hereby corrected as shown below:

Column 2,
Line 41, "each Q is independently or or a combination of -R and -OR" should be
-- each Q is independently OR or a combination of -R and -OR --

Column 3,
Line 26, sentence beginning "Regarding the coupling agent..." should begin a new paragraph.
Line 31, "Silquest® A-I 102 silane" should be -- Silquest® A-1102 silane --
Line 38, "Sllquest® A-1128 silane" should be -- Silquest® A-1128 silane --
Line 40, "Silguest® Y-9669 silane" should be -- Silquest® Y-9969 silane --

Column 6,
Line 29, "Silquest® Y11597" should be -- Silquest® Y11597 --

Column 7,
Lines 66-67, "comprising silicon a water soluable silane" should read -- comprising a water soluble silane --

Column 8,
Line 10, "a C100 alkyl group" should be -- a $C_{1-10}$ alkyl group --

Signed and Sealed this

Eleventh Day of May, 2004

JON W. DUDAS
*Acting Director of the United States Patent and Trademark Office*